June 11, 1957 H. DEKER 2,795,046

STEREOSCOPIC APPARATUS FOR PLOTTING FROM AIR PHOTOGRAPHS

Filed June 15, 1954 5 Sheets-Sheet 1

June 11, 1957 H. DEKER 2,795,046

STEREOSCOPIC APPARATUS FOR PLOTTING FROM AIR PHOTOGRAPHS

Filed June 15, 1954 5 Sheets-Sheet 2

STEREOSCOPIC APPARATUS FOR PLOTTING FROM AIR PHOTOGRAPHS

Filed June 15, 1954 5 Sheets-Sheet 4

June 11, 1957 H. DEKER 2,795,046

STEREOSCOPIC APPARATUS FOR PLOTTING FROM AIR PHOTOGRAPHS

Filed June 15, 1954 5 Sheets-Sheet 5

United States Patent Office 2,795,046

Patented June 11, 1957

2,795,046

STEREOSCOPIC APPARATUS FOR PLOTTING FROM AIR PHOTOGRAPHS

Herman Deker, Stuttgart-Degerloch, Germany, assignor to Zeiss Aerotopograph G. m. b. H., Munich, Bavaria, Germany Application June 15, 1954, Serial No. 436,765

Claims priority, application Germany June 13, 1953

10 Claims. (Cl. 33—1)

This invention concerns an instrument for stereoscopically plotting approximately vertical-axis aerial photographs by horizontal parallax measurement, in which the photos are treated as strictly vertical views. As is well known, parallax errors are generated in the horizontal parallax measurement of identical points of aerial views, which in their totality manifest themselves as a deformation of a model in the manner that an originally plane surface into a saddle-shaped surface in the stereoscopic model is falsified.

Such parallax errors could be eliminated till now only by lengthy computational or graphic methods, so that a very large expenditure of time was needed for error-free evaluation. The invention eliminates this drawback by so coupling the plotting instrument with a computing instrument that, in setting a mark provided for parallax measurement on a point $(x, y)$ in the stereo image, corresponding values $x$ and $y$ are set in the computer, and that the computer with these values solves equation (1) $$z=ax+by+cxy+d$$

where $a$, $b$, $c$ and $d$ are selectable constants such that Equation 1, assumed as being a surface, approximates the deformation of the model resulting from the treatment of the air views as strict verticals and where $z$ is the parallax correction. In this way, it becomes possible to determine, by customary procedures, the parallax values for a point $(x, y)$ and to read from the computer the corresponding parallax correction $z$, so that the error-free parallax value can immediately be stated.

As a computer, any known instrument can be used which will solve Equation 1. An especially advantageous form of such an instrument, however, forms a further object of the invention. This instrument is characterized in that it has two straight pivoted and slidable guide tracks for setting the constants $a$, $b$, $c$, and $d$, and that a slide for setting one of the independently variable values is provided such that setting this value determines the inclination of a beam provided on the slide, whereby the differential distance of two points corresponding to the value set on the tracks from a straight line assumed in the direction of motion of the slide, is transformed by indicating devices into a shift of the beam; and that setting the other independently variable value, a slidable indicator is provided which spots a point on the beam corresponding to this value, the deflection of this indicator showing the $z$-value.

The values can be set on scales provided on the instrument for the purpose. It is, however, especially advantageous to couple the setting device of the marks for parallax measurement with a carriage bearing the $z$-value indicator. By this measure, in setting the mark on an image point $(x, y)$, the indicator as well as the slide are also displaced and the corresponding values $x$ and $y$ are automatically set in the computer.

It has proved of advantage to design the indicating devices for finding the differential distance of the track from the straight line assumed as lying in the direction of motion of the slide, in the form of bell-crank levers pivoted on the slide, such that one arm of each bell-crank lever is turned by a rod whenever the slide is shifted arranged at a constant distance from the slide and movable at right angles to the direction of motion of the slide and sliding with one end on the guide track, while the other arm of each bell-crank lever causes one end of the beam to be shifted by a rod disposed at a fixed distance from the bell-crank pivot center and movable in the direction of motion of the slide.

In another form of the instrument, only one guide track and one indicating device sliding on it are provided, the beam pivoting around a fixed point on the slide.

If scales are provided for setting the $x$- and $y$-values, then the $y$-values will preferably be set on a fixed scale by an index provided on the slide, while the $x$-scale is to advantage disposed on the slide. The $x$-value is best set on this scale by an index on the carriage bearing the $z$-scale and the $z$-indicator. Since Equation 1 represents only an approximation to the saddle-deformed model, the parallax values determined still contain errors of a higher order. While these errors are very small, it sometimes happens that also such errors are to be eliminated. This is accomplished by additionally approximating the saddle-shaped surface by a surface of the form (2) $$z=a_1x+cx^2+d$$

The computing instrument of the invention solves also this equation if the $y$-scale is used as a second $x$-scale, the $x$-value in this case being set on both scales. Preferably in this event, however, is the use of a transmission gear causing the movement of the slide along the $y$-scale, to effect an equal displacement of the $z$-value indicator in the $x$-direction.

An especially simple design of the instrument for solving Equation 2 is obtained by forming the indicator of two rods set at right angles to the direction of motion of and carried on the slide, one end of each rod sliding on the corresponding guide track, while the other ends shift the beam. The indicator on the beam and the indicator on the tracks can then be coupled by a transmission at a ratio of 1:1, in order to obtain an equidirectional motion.

In a further detail of the invention, the $z$-value determined with one of the instruments above described can be used for setting a slide on a further apparatus, with the $z$-value indicator connected to the slide of this further instrument. In this way, all equations can be solved which originate when the $y$- or $x$-value in Equations 1 or 2 is replaced by the $z$-value of these Equations 1 or 2. In particular, however, two or more instruments can be so coupled as to cause the final values of the serval instruments to be added. Together with the coupling by substitution, it becomes possible to solve a multiplicity of higher-order equations, so that the parallax values can be determined with any desired degree of precision.

In the accompanying drawings, representative examples of the object of the invention are shown:

Figure 1:
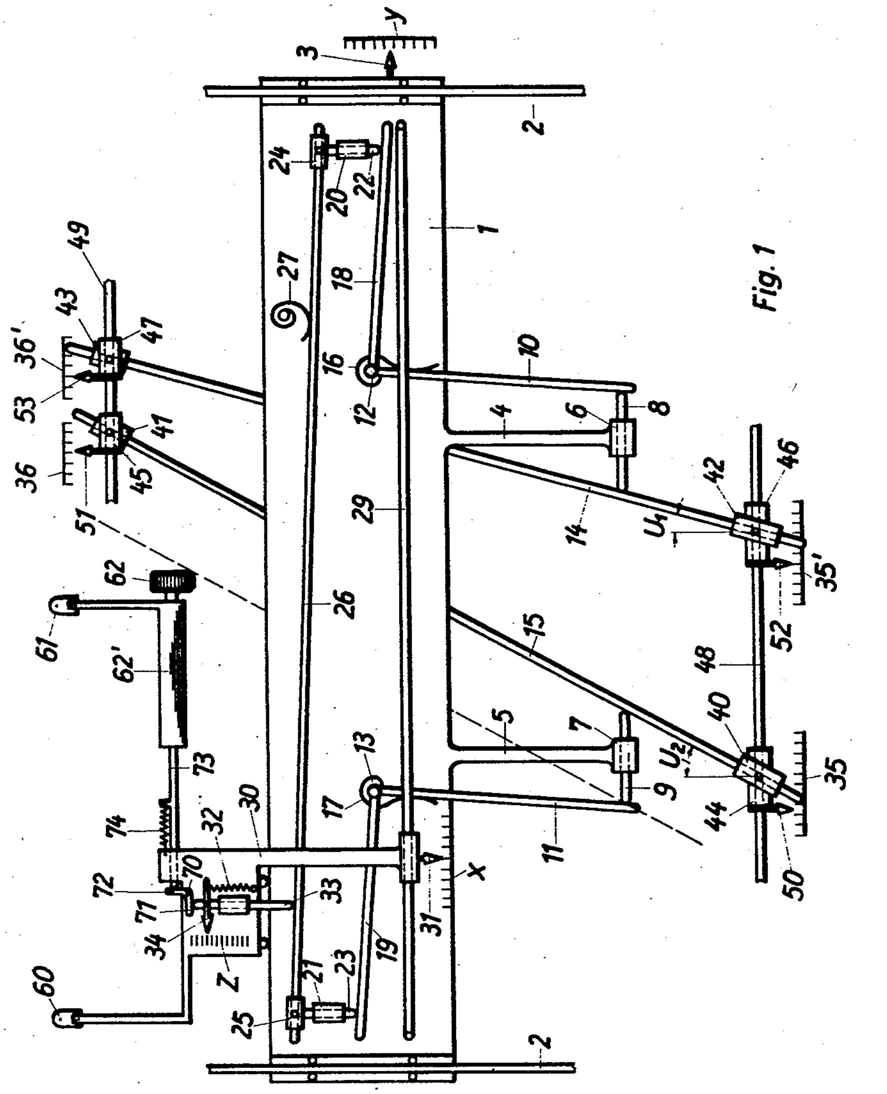
Fig. 1 is an instrument for solving the equation $$z=ax+by+cxy+d$$

In the design of Fig. 1 a slide 1 is movable along tracks 2, and has an index 3 with which a value on scale $y$ can be set by hand or by means (not shown) of a screw motion. On slide 1 are two extensions 4 and 5 bearing at their ends sleeves 6 and 7 in which studs 8 and 9 can slide at right angles to the direction of motion of the slide.

The studs 8 and 9 are kept pressed by arms 10 and 11 of bell-crank levers 10, 18 and 11, 19 pivoting around centers 12 and 13 on slide 1, against adjustable tracks 14 and 15. For this purpose, the arms 10 and 11 are under the action of springs 16 and 17. The second pair of arms, 18 and 19 of the bell-crank levers contact studs 22 and 23 slidable in guides 20 and 21 on slide 1. Attached to and pivoted on studs 22 and 23 are sleeves 24 and 25 in which a beam 26 is slidable. Beam 26 is kept pressed by a spring 27 against the studs 22 and 23 and keeps these studs in contact with the arms 18 and 19.

Movable along a guideway 29 on slide 1 is a slide 30 with a scale $z$. With the aid of an index 31, slide 30 can be set to a given value on a scale $x$ connected with slide 1, either by hand or by a screw motion not shown.

An indicator 33 kept under the action of a spring 32 slides on one end of beam 26, its deflection being read from scale $z$ opposite index 34. For setting tracks 14 and 15, these tracks are slidable in sleeves 40, 41, 42, and 43, which turn on sleeves 44, 45, 46, and 47. The sleeves 44, 45, 46, and 47 are slidable along guideways 48 and 49 and bear indexes 50, 51, 52, and 53, with which values can be set on scales 35 and 36 as well as 35′ and 36′. These scales are divided in any desired ratio, so that from the difference between values set on two corresponding scales 35, 36 or 35′, 36′, and from the known spacing of tracks 48 and 49, the inclinations of tracks 14 and 15 can be set and the tracks shifted in parallel.

The sleeves 40, 41, 42, and 43 can be shifted either by hand, or mechanically by screw motions not shown. On slide 30 are two marks, 60 and 61, for parallax measurement. These marks are set by means of scales $x$ and $y$ on two identical points $x$, $y$ in the aerial views, causing a corresponding shift of indicator 33 and slide 1. The marks 60 and 61 can be displaced relative to each other by means of a micrometer screw 62, thereby allowing the two marks to be brought into coincidence in the stereoscopic image, and the parallax values to be determined from the resultant displacement.

Figure 2:
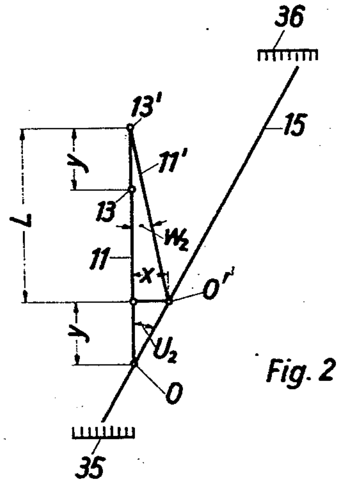
Figs. 2 to 4 are diagrams explaining the functioning of the instrument of Fig. 1.

The mode of action of the instrument shall now be described with reference to Figs. 2 to 4:

For reasons of simplification, arm 11 is shown in Fig. 2 as acting directly on guide track 15. This merely means a parallel shift of track 15 by the length of stud 9, Fig. 1, but is without influence upon the inclination of beam 26. Guide track 15 is set to a certain angle of inclination $u_2$ with the aid of scales 35, 36. In shifting slide 1 to value $y$, point 13 travels into point 13′, while contact point O of arm 11 and of track 15 moves to O′. Now arm 11 passes from its position, which has been assumed as perpendicular for $y=0$, into the position 11′ through the points O′, 13′, and has so turned by angle $w_2$.

By composing the movement of point O to O′ from the two lengths $x$ and $y$, the swing of arm 11 by angle $w_2$ is:

$$\tan w_2 = x/L$$

where L is the length of the stretch between points O and 13. In addition $$x = y\cdot\tan u_2 \text{ and hence}$$
$$\tan w_2 = y\cdot(\tan u_2)/L$$

A corresponding angular rotation $w_1$ follows on the same assumptions for arm 10 of the right-hand bell-crank lever:

$$\tan w_1 = y\cdot(\tan u_1)/L$$

where $u_1$ is the inclination of track 14, and L the perpendicular distance of stud 8 from pivotal center 12.

Figure 3:
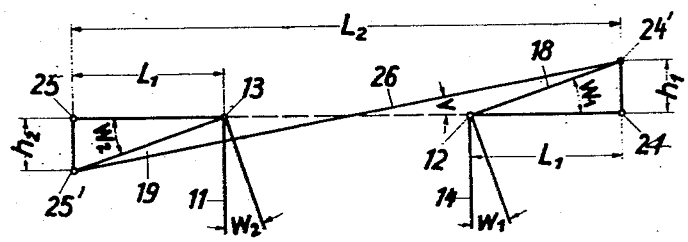

By the same angles $w_1$ and $w_2$ swing the arms 18 and 19, Fig. 3. Assuming the distances of studs 22 and 23 in Fig. 1 from the pivotal centers 12 and 13 to be $L_1$, there follows a shift of the points 24 and 25 in Fig. 3, into the positions 24′ and 25′ as being:

$$h_1 = L_1\cdot\tan w_1 = L_1\cdot y\cdot(\tan u_1)/L$$
$$h_2 = L_1\cdot \tan w_2 = L_1\cdot y\cdot(\tan u_2)/L$$

By these amounts, the ends of beam 26 are raised or lowered at the points 24 and 25. If the perpendicular distance between studs 22 and 23 equals $L_2$, then the beam assumes an inclination $v$ which follows from $$\tan v = (h_1+h_2)/L_2$$

or $$(3)\qquad \tan v = L_1\cdot y\cdot(\tan u_1+\tan u_2)/(L\cdot L_2)$$

Figure 4:
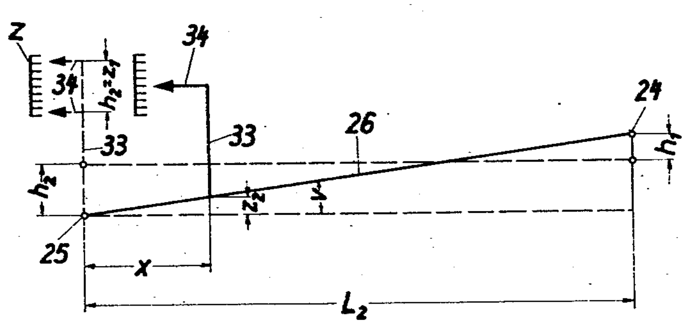

By assuming indicator 33 as shifted into point 25, Fig. 4, when index 31 should register $x=0$, then index 34 has dropped by $z_1=h_2$ during the $y$-displacement. If, however, a value is set on scale $x$, which means that the indicator is shifted by $x$, then index 34 is shifted by $$(3')\qquad z_2 = x\cdot\tan v$$

upward or downward, in accordance with the inclination of beam 26.

The total $z$-value resulting from a movement by $x$ and $y$ then equals $$z = z_1+z_2 = (L_1\cdot y\cdot(\tan u_2)/L)+x\cdot\tan v$$
$$= (L_1\cdot y\cdot(\tan u_2)/L)+xy\cdot L_1(\tan u_1+\tan u_2)/(L\cdot L_2)$$

Since all quantities on the right-hand side, excepting $x$ and $y$, are constants:

$$(4)\qquad z = A_1y+A_2xy$$

with $$A_1 = L_1\cdot(\tan u_2)/L$$

and $$A_2 = L_1(\tan u_1+\tan u_2)/(L\cdot L_2)$$

L, $L_1$ and $L_2$ are construction quantities, and hence $A_1$ and $A_2$ are functions of the inclinations of guide tracks 14 and 15. In this computation, the zero positions of $x$ and $y$ on their scales have been arbitrarily assumed. For this reason, in order to transmute Equation 4 into a type of the Equation 1 to be solved, additional coordinate displacements in the $x$- and $y$-directions may be made. It is, however, also possible to retain the zero points already selected and to shift tracks 14 and 15 in parallel.

In the first case, constants $a$, $b$, $c$, and $d$ of Equation 1 are governed by the inclination of tracks 14 and 15, and by the selection of the zero points of the $x$- and $y$-scales. In the second case, however, constants $a$, $b$, $c$, and $d$ are dependent only upon the position and inclination of the tracks. If, for instance, track 15 in Fig. 1 is shifted by the distance $m$ to the right, then point 25 sinks by $m' = L_1\cdot m/L$. By this amount also sinks index 34, if indicator 33 is assumed as shifted in position $x=0$ into point 25, i. e. $m'$ represents a constant contribution to the $z$-value of Equation 4.

In this parallel shift, beam 26 turns further by angle $v'$. With $$\tan v' = m'/L_2 = L_1\cdot m/(L\cdot L_2)$$

in the displacement of indicator 33 to the value $x$, index 34 therefore registers a $z$-value which has again changed relative to the value in Equation 4 by $x\cdot L_1\cdot m/(L\cdot L_2)$.

By adding, therefore, the two components on the right-hand side of Equation 4, there follows equation $$(4')\qquad z = A_1\cdot y+A_2\cdot xy+(x\cdot L_1\cdot m/L\cdot L_2))+L_1\cdot m/L$$

A parallel shift of track 14 towards the right by $n$ gives a further component to the factor of the $x$-member, of a magnitude $n\cdot L_1/(L\cdot L_2)$, causing Equation 4′ to pass into $$(4'')\qquad z = (L_1/(L\cdot L_2))\cdot(m+n)\cdot x+A_1\cdot y+A_2xy+L_1\cdot m/L$$

The shift of track 14 does not affect the constant member of Equation 4′, because, for reasons of simplicity, the indicator 33 for $x=0$ has been as assumed as in point 25, which remains stationary when track 14 is shifted. Equation 4″ is of the type of Equation 1. By making $L=L_1$, a purely constructive measure, Equation 4″ becomes $$(4''')\quad z=((m+n)x/L_2)+y\cdot\tan u_2+((\tan u_1+\tan u_2)xy/L_2)+m$$

A comparison of the coefficients of this simplified equation with those of Equation 1 and with given constants *a, b, c,* and *d* at once supplied the settings $m$, $n$, $\tan u_1$, and $\tan u_2$ without lengthy calculation.

Figure 8:
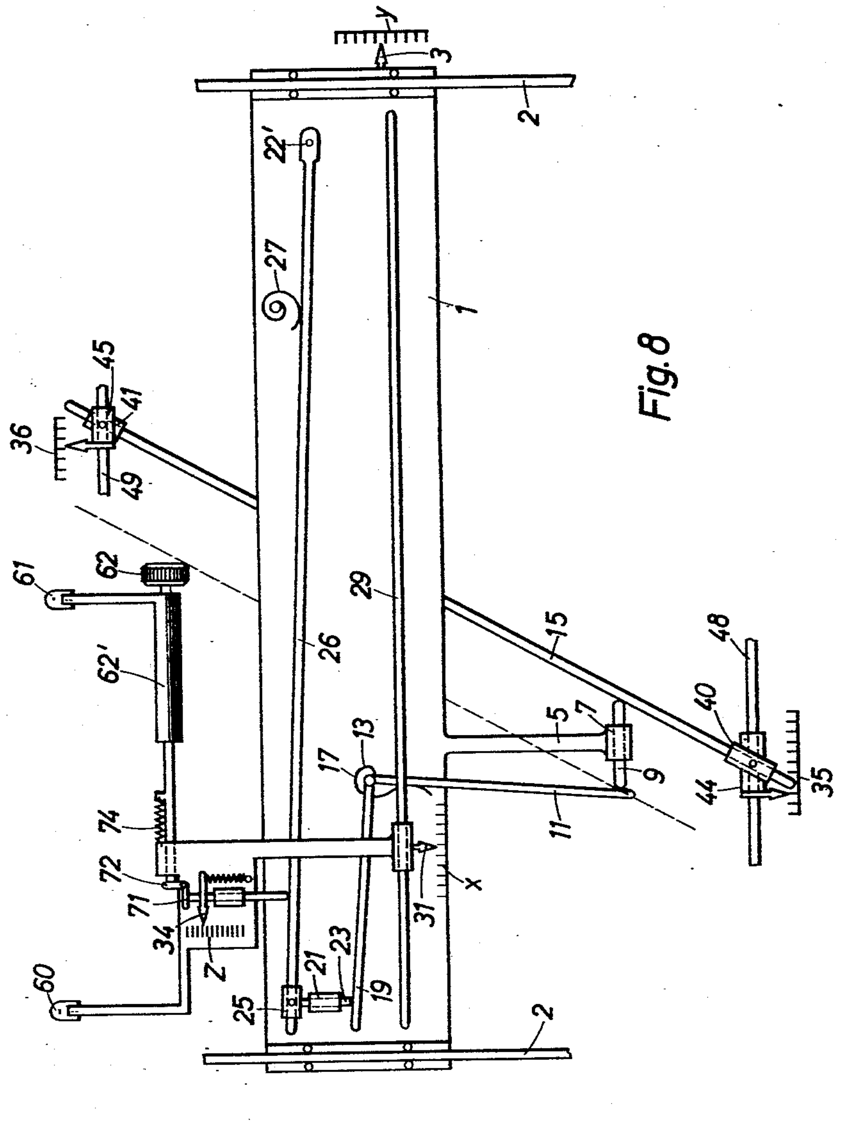
Fig. 8 is an altered design for solving the equation of Fig. 1.

The settings $n$ and $\tan u_1$ of track 14 are found only in the form of additives to $m$ and $\tan u_2$, hence, Equation 1 can also be solved without coefficients being reduced to zero by using, for instance, $u_1=n=0$. Arm 10 in this case executes no angular rotation so that the entire bell-crank lever 10, 18 and track 14 can be left out. With this design, beam 26 must pivot around a point 22′ on slide 1 (Fig. 8). The remaining arrangement is not altered.

This design of the instrument has the advantage of greater simplicity, but does not permit the simple determination of the setting quantities by the coefficient comparison of Equations 4‴ and 1, because for setting constants *a, b, c* and *d* besides setting the position and inclination of track 15, it becomes necessary to make additional coordinate shifts in the *x*- and *y*-directions in order so to obtain four quantities for the four given constants.

A particularly simple way of setting the inclinations of the tracks is obtained without the necessity of knowing the constants *a, b, c,* and *d,* if the parallax values of four points $(x, y)$ in the photographs are known. In this case, the known parallax values are set by suitably spacing the marks 60 and 61, and these marks shifted over the points $(x, y)$ of the photos with the aid of the *x*- and *y*-scales.

Since the parallax value set is the exact value, scale *z* must register no parallax value for any of the four points. The tracks are therefore shifted until index 34 registers $z=0$, or the spatial model observed appears free from parallax. To effect this it ordinarily suffices for example, for the first point to shift index 50 along scale 35. For the second value, this process is repeated with the parallax value corresponding to this point, whereby index 52 preferably is displaced along scale 35′. For the third and fourth points, the upper ends of the tracks are analogously inclined by shifting indexes 53 and 51.

When the last shift has been made, the instrument will again show a small correction value *z* for the first point, and which can be eliminated by resetting one of the tracks. The same procedure is followed for the other points, until index 34 registers the correction value 0 for each of the four points. Through these four points then passes the hyberbolic surface of Equation 1 which approximates the saddle-shaped model and the computing instrument shows the parallax corrections for all other points $(x, y)$, without any need of Equation 1 being known at all.

By making $x=y$ in Equation 1, the instrument solves equation $$(2)\quad z=a_1x+cx^2+d$$

Figure 5:
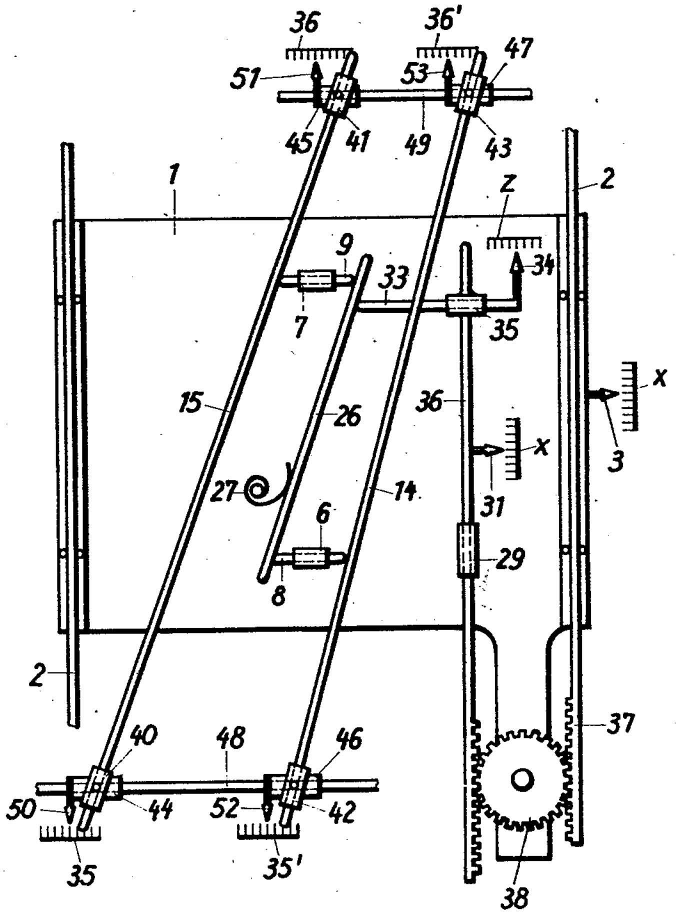
Fig. 5 is an altered design for solving the equation $$z=a_1x+cy^2+d$$

While the solution can be obtained with the instrument of Fig. 1, this requires two settings of the *x*-value. Fig. 5 shows an advantageous design of an instrument for solving this equation with only one setting. The components taken over from Fig. 1 are designated by the same reference numbers. The studs 8 and 9 movable in the sleeves 6 and 7 mounted on slide 1, as in the instrument of Fig. 1 register the inclinations of tracks 14 and 15. Those ends of the studs not sliding on the tracks, press directly against beam 26 and so determine its inclination.

Indicator 33 spots a point on beam 26 and index 34 registers a value on scale *z*. The indicator 33 is slidable in sleeve 35, which is attached to a rod 36 carrying index 31. At its lower end, rod 36 is in the form of a rack. A second rack, 37, is provided on the right-hand guide track 2. Meshing with racks 36 and 37 is a gear 38 pivoted on slide 1. When slide 1 is shifted endwise by a distance *x*, the gear turns by a corresponding angle, and rack 36 is likewise shifted on the slide in the same direction by a distance equal to *x*. Accordingly, both index 3 and index 31 at all times register the same value *x*.

Figure 6:
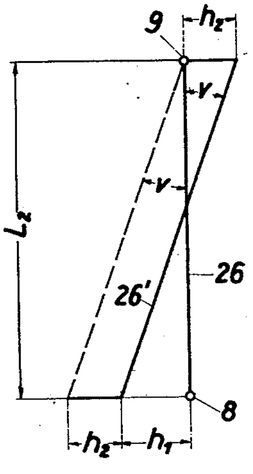
Figs. 6 and 7 are diagrams explaining the functioning of the instrument of Fig. 5.
Figure 7:
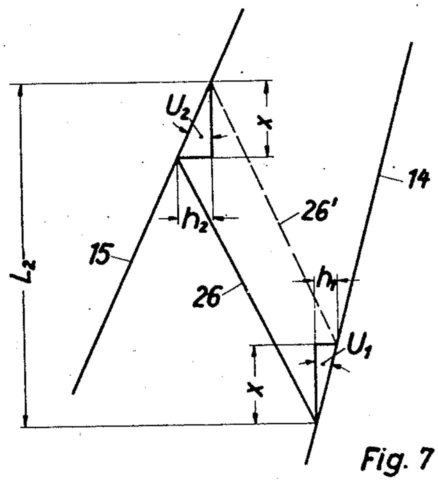

The mode of action of this design will be understood by referring to Figs. 6 and 7. If stud 9 is shifted by $h_2$ and stud 8 by $h_1$, beam 26 turns by angle $v$ into position 26′. It is $$\tan v=(h_1+h_2)/L_2$$

where $L_2$ is the perpendicular spacing of studs 8 and 9. According to Fig. 7:

$$h_2=x\cdot\tan u_2$$

$$h_1=x\cdot\tan u_1$$

where $u_1$ and $u_2$ again represent the inclinations of tracks 14 and 15. Accordingly:

$$\tan v=x\cdot(\tan u_1+\tan u_2)/L_2$$

or in other words, of the type of Equation 3, excepting only that *y* is replaced by *x*. Since there has been no alteration in the indicating device for the *z*-values, this equation follows the same principle as in the instrument of Fig. 1, transforming into $$z=a_1x+cx^2+d$$

With the instruments of Figs. 1 and 5, the parallax error *z* can be read from the *z*-scales with the aid of the indexes 34. By a further design feature of the invention, this parallax error is immediately co-transmitted into the measurement result, i. e. the parallax screw, in Fig. 1 the micrometer spindle 62, immediately registers the corrected parallax value.

This is attained by so coupling at least one of the marks serving for parallax measurement, for instance mark 61, with indicator 33 that in the displacement of indicator 33, the mark alters its distance from mark 60. In Fig. 1, such a coupling is indicated. On slide 30 and swinging around point 70, a bell-crank lever 71, 72 is provided. Arm 71 of this lever bears against indicator 33, and the other arm, 72, against a rod 73 slidable on a guideway on slide 30. By means of a spring 74, rod 73, to which mark 61 is connected by way of micrometer 62, is at all times held in contact with indicator 33.

This arrangement functions as follows:

Whenever indicator 33 is shifted, rod 73, micrometer 62′ and mark 61 are displaced by way of bell-crank levers 71, 72. Mark 61 at the same time alters its distance from mark 60. By working micrometer screw 62, mark 61 is now re-shifted relative to mark 60 until the two marks are in coincidence in the stereoscopic model. The reading of micrometer 62 is the error-free parallax.

I claim:

1. An instrument for stereo plotting approximately vertical-axis aerial photographs by parallax measurement, in which the photographs are treated as if they were strictly verticals, comprising a plurality of marks, means for setting said marks provided for the parallax measurement on a point $(x, y)$ of the stereoscopic image, a computing instrument connected with said means having means to set corresponding values *x* and *y*, said computing instrument being of the kind to solve with said values *x* and *y* the equation $z=ax+by+cxy+d$, where *a, b, c* and *d* are selectable constants such that the said equation approximates a deformation of the stereoscopic model resulting from the treatment of the air views as strict verticals, and *z* denoting the parallax correction.

2. An instrument for stereo plotting approximately vertical-axis aerial photographs by parallax measurement, in which the photographs are treated as if they were strictly verticals, comprising a plurality of marks, means for setting said marks provided for the parallax measurement on a point $(x, y)$ of the stereoscopic image, a computing instrument connected with said means having means to set corresponding values $x$ and $y$, said computing instrument being of the kind to solve with said values $x$ and $y$ the equation $z=ax+by+cxy+d$, where $a$, $b$, $c$ and $d$ are selectable constants such that the said equation approximates a deformation of the stereoscopic model resulting from the treatment of the air views as strict verticals, and $z$ denoting the parallax correction, said computing instrument comprising two straight pivoted and slidable guide tracks for setting the constants $a$, $b$, $c$ and $d$, a movable slide for setting the one independently variable value, a movable beam provided on the said slide, devices arranged on said slide provided to transform the differential distances of two points corresponding to the values set by the said slide on the tracks from a straight line assumed in the direction of motion of said slide into a shift of said beam, means including slidable indicating devices provided for setting the other independently variable value, and to spot a point on said beam corresponding to this other value as well as to register said $z$-value.

3. An instrument as in claim 2, characterized in that the setting means of the marks serving for parallax measurement are connected with a carriage bearing the indicating device for the $z$-value.

4. An instrument as in claim 2, characterized in that devices for transforming the differential distance of the tracks from the straight line assumed in the direction of motion of the slide, are in the form of bell-crank levers pivoted on the slide such that one arm of each bell-crank lever is turned by a rod arranged at a constant distance from and movable in a direction perpendicular to the direction of motion of the slide, and sliding with one end on the guide track; while the other arm of each bell-crank lever causes one end of the beam to be shifted by a rod disposed at a fixed distance from the pivotal center of the bell-crank lever and movable in the direction of motion of the slide.

5. An instrument as in claim 2, characterized in that the $y$-value is set on a fixed scale with the aid of an index provided on the said slide, and that the $x$-value is set on a scale arranged on the slide by an index provided on the said indicating device setting the $x$-value.

6. An instrument as in claim 2, characterized in that the transforming devices each include two rods movable on and perpendicular to the direction of motion of the slide, one end of each rod riding on the guide tracks while the other ends shift the beam.

7. An instrument as in claim 2, characterized in that the transforming devices each include two rods movable on and perpendicular to the direction of motion of the slide, one end of each rod riding on the guide tracks while the other ends shift the beam and that means are provided to couple the said indicating device setting the $x$-value and the transforming devices in the ratio of 1:1 in order to obtain equidirectional motion.

8. An instrument as in claim 2, characterized in that the setting means for at least one of the marks for parallax measurement is connected with the $z$-value registering device as to cause this service in being displaced, to alter the distance of the one mark from the other mark.

9. An instrument as in claim 2, characterized in that the setting means for at least one of the marks for parallax measurement is connected with the $z$-value registering device as to cause this device in being displaced, to alter the distance of the one mark from the other mark, said setting means comprising a rocking bell-crank lever which is provided on a carriage bearing the $z$-value registering device and said means for setting the marks, one of the arms of this lever being adapted to be actuated by the registering device and the other arm to shift the mark.

10. An instrument for stereo plotting approximately vertical-axis aerial photographs by parallax measurement, in which the photographs are treated as if they were strictly verticals, comprising a plurality of marks, means for setting said marks provided for the parallax measurement on a point $(x, y)$ of the stereoscopic image, a computing instrument connected with said means having means to set corresponding values $x$ and $y$, said computing instrument being of the kind to solve with said values $x$ and $y$ the equation $z=ax+by+cxy+d$, where $a$, $b$, $c$ and $d$ are selectable constants such that the said equation approximates a deformation of the stereoscopic model resulting from the treatment of the air views as strict verticals, and $z$ denoting the parallax correction, said computing instrument comprising one straight pivoted and slidable track for setting the constants $a$, $b$, $c$ and $d$, a movable slide for setting the one independently variable value, a beam turnable mounted on said slide, a device arranged on said slide provided to transform the distance of a point corresponding to the value set by said slide on the track from a straight line assumed in the direction of motion of said slide into a swing of said beam, means including slidable indicating devices provided for setting the other independently variable value, and to spot a point on said beam corresponding to this other value as well as to register said $z$-value.

References Cited in the file of this patent

UNITED STATES PATENTS 2,210,939 Garrett ---------------- Aug. 13, 1940

FOREIGN PATENTS 708,221 Germany -------------- July 15, 1941